United States Patent [19]
Larson

[11] Patent Number: 4,838,205
[45] Date of Patent: Jun. 13, 1989

[54] BIRD FEEDER WITH SCATTER RESTRICTING FEEDING TRAY

[75] Inventor: Donald A. Larson, Circle Pines, Minn.

[73] Assignee: North States Industries, Inc., Minneapolis, Minn.

[21] Appl. No.: 148,047

[22] Filed: Jan. 25, 1988

[51] Int. Cl.[4] ............................................. A01K 39/00
[52] U.S. Cl. ...................................................... 119/52 R
[58] Field of Search .................... 119/51 R, 52 R, 23, 119/24; D30/110, 121, 124, 127, 128, 129, 130, 131

[56] References Cited

U.S. PATENT DOCUMENTS

| | | | |
|---|---|---|---|
| D. 115,321 | 6/1939 | Pueschel | 119/52 R X |
| D. 173,658 | 12/1954 | Jones | D30/128 |
| D. 240,743 | 7/1976 | Renfro | D30/15 |
| D. 244,786 | 6/1977 | Dryden | D30/128 |
| D. 249,285 | 9/1978 | Podjan | D30/124 |
| D. 273,429 | 4/1984 | Kilham | D30/15 |
| 410,563 | 9/1889 | Seward | 119/52 R |
| 503,664 | 8/1893 | Jones . | |
| 1,005,071 | 10/1911 | Randall | 119/52 R |
| 1,536,699 | 5/1925 | Whitman . | |
| 2,475,207 | 7/1949 | Smith | 119/52 |
| 2,505,396 | 4/1950 | Grindstaff | 119/52 R |
| 2,696,803 | 12/1954 | Deffenbaugh | 119/52 |
| 2,808,029 | 10/1957 | Geerlings | 119/52 R |
| 2,866,435 | 12/1958 | Blazier | 119/53 |
| 2,930,352 | 3/1960 | Kasten | 119/52 |
| 3,136,296 | 6/1964 | Luin | 119/52 R |
| 3,205,860 | 9/1965 | Moore | 119/52 |
| 3,822,674 | 7/1974 | Tobin | D30/124 X |

*Primary Examiner*—Gene Mancene
*Assistant Examiner*—R. Thomas Price
*Attorney, Agent, or Firm*—William L. Huebsch

[57] ABSTRACT

A bird feeder including a shallow feeding tray into which bird feed flows through a passageway from a supply cavity above the tray, which bird feeder includes spaced vertical partitions within the feeding tray which restrict wind blowing bird feed from the feeding tray and brushing or scattering of bird feed from the feeding tray by side to side motion of the bill of a bird perched on the feeder.

6 Claims, 2 Drawing Sheets

BIRD FEEDER WITH SCATTER RESTRICTING FEEDING TRAY

TECHNICAL FIELD

The present invention relates to bird feeders of the type having one or more shallow feeding trays into which bird feed (typically in the form of mixture of seeds) flows by gravity from a supply cavity above the trays.

BACKGROUND ART

Well known is the type of bird feeder comprising side walls attached together and to a bottom wall and projecting above the bottom wall to define a cavity adapted to contain a supply of bird feed, with the bottom wall including at least one tray portion extending past an outer surface of one of the side walls and having fixed thereon an edge wall at a position spaced from that side wall to help define a shallow feeding tray between that side wall and the edge wall. Typically the walls define a passageway between the cavity and the feeding tray to afford the flow of bird feed from the cavity to a shallow recess in the feeding tray. Such bird feeders also include perch means (which may be provided by the upper edge of the edge wall or by an elongate perch bar fixed in spaced generally parallel relationship along the edge wall) for allowing birds to perch along the edge wall facing the feeding tray while they eat.

While such bird feeders are effective in dispensing bird feed, certain types of birds (particularly ground feeding birds such a sparrows and grackles) have a tendency to throw or scatter bird feed from the tray by swinging their beaks from side to side within the tray so that significant amounts of bird feed can be wasted. Also, strong winds can blow birdseed out of such feeders and onto the ground, resulting in wasted feed.

DISCLOSURE OF THE INVENTION

The present invention provides an improved bird feeder that both restricts birds from throwing bird feed from a feeding tray on the feeder by swinging their beaks from side to side, and prevents wind from blowing feed from the feeding tray, thereby reducing the amount of bird feed that will be wasted.

According to the present invention there is provided a bird feeder of the type described above comprising side walls attached together and to a bottom wall and projecting above the bottom wall to define a cavity adapted to contain a supply of bird feed. The bottom wall includes at least one tray portion extending past an outer surface of one of the side walls and having fixed thereon an elongate edge wall at a position spaced from that side wall to help define a feeding tray having a shallow recess adapted to contain bird feed, and the walls define a passageway affording the flow of bird feed from the cavity to the shallow recess in the feeding tray. The bird feeder also includes perch means (which may be provided by the upper edge of the edge wall or by an elongate perch bar fixed in spaced generally parallel relationship along the edge wall) for allowing birds to perch along the edge wall facing the feeding tray generally at a right angle to the length of the edge wall while they eat from the feeding tray.

Unlike the bird feeders described above, however, the bird feeder according to the present invention includes the improvement of a plurality of spaced vertical partitions within the shallow recess, which partitions extending at least part way between the edge wall and the adjacent side wall to restrict wind from blowing bird seed from the shallow recess and to restrict brushing or scattering of bird feed from the feeding tray by side to side motion of the bill of a bird perched on the perch means.

In preferred embodiments of a bird feeder according to the present invention the opening is positioned generally centrally along the side wall, and the spaced partitions extend less than the entire distance between the side wall and the edge wall with the partitions being alternately adjacent the side wall and the edge wall to form a labyrinth defining tortuous paths for movement of bird feed through the opening and along the shallow recess in the feeding tray in two directions away from the opening, which paths are wide enough for movement along the tray of even the largest size of bird feed such as sunflower seeds. In such bird feeders the partitions are preferably elongate, extend generally at a right angle to the outer surface of the side wall, and each of the partitions has a length about ⅜ to ½ inch less that the distance between the edge wall and the side wall and is spaced by at least that distance from the adjacent partition to provide that desired path width.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
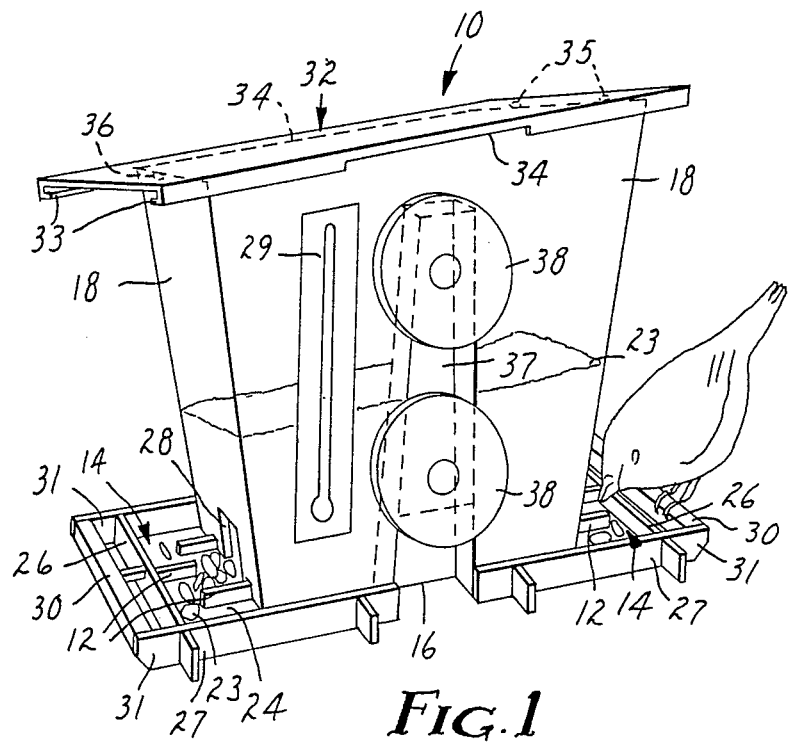
FIG. 1 is a perspective view of a first embodiment of a bird feeder according to the present invention.
Figure 2:
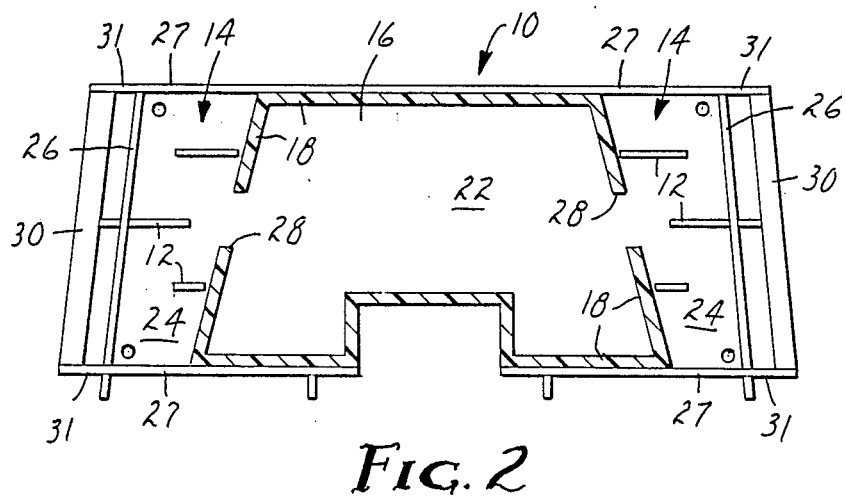
FIG. 2 is a horizontal sectional view of the bird feeder of FIG. 1.

Referring now to FIGS. 1 and 2 of the drawing, there is shown a first embodiment of a bird feeder according to the present invention, generally designated by the reference numeral 10, which bird feeder 10 has spaced vertical partitions 12 within two shallow feeding trays 14 on the feeder 10 to restrict brushing or scattering of bird feed from the feeding trays 14 by side to side motion of the bill of a bird eating from the feeder 10, and to restrict wind from blowing bird feed from the feeding trays 14.

Generally the bird feeder 10 comprises a bottom wall 16 and four side walls 18 attached together and to the bottom wall 16 along their edges with the side walls 18 projecting above the top surface of the bottom wall 16 so that a central portion of the bottom wall 16 and the side walls 18 define a cavity 22 adapted to contain a supply of bird feed 23. The bottom wall 16 includes two end portions 24 extending past the outer surfaces of opposite diverging end side walls 18 and the feeder 10 further includes elongate outer edge walls 26 attached to the end portions 24 of the bottom wall 16 and projecting above the top surface of the bottom wall 16 at positions spaced from the adjacent end side wall 18 to define with the end portions 24 and two end edge walls 27 between the adjacent side wall 18 and the opposite ends of the outer edge walls 26 the two shallow feeding trays 14 that have shallow recesses adapted to contain bird feed. The bottom wall 16 and the end side walls 18 define passageways 28 positioned generally centrally along the end side walls 18 between the cavity 22 and the shallow recesses in the feeding trays 14, which passageways 28 afford the flow of bird feed from the cavity 22 into the shallow recesses in the feeding trays 14. The feeder 10 includes perch means in the form of elongate perch bars 30 fixed in spaced generally parallel relationship along the outer edge walls 26 by normally projecting support bars 31 for allowing birds to perch along the outer edge walls 26 with the center lines of perching birds normally oriented generally at a right angle to the length of the adjacent edge wall 26 and the birds facing the feeding tray 14 while the birds eat from the feeding trays 14.

The feeder 10 also includes the improvement according to the present invention comprising a plurality of the vertical partitions 12 in parallel spaced relationship within the shallow recesses of the feeding trays 14 and extending at least part way between the outer edge walls 26 and their adjacent side walls 18, the purpose of which partitions 12 is to restrict brushing of bird feed from the shallow recesses by side to side motion of the bills of birds perched on the perch bars 30, and to restrict wind from blowing feed from the feeding trays 14. The spaced partitions 12 extend less than the entire distance between the outer edge walls 26 and the adjacent end side walls 18 and alternately are adjacent the end side walls 18 and the outer edge walls 26 to form a labyrinth defining tortuous paths for movement of bird feed 23 through the passageways 28 and along the shallow recesses in the feeding trays 14 in two directions away from the passageways 28. Those tortuous paths have a minimum width between the partitions 12 and between the ends of the partitions 12 spaced from the outer edge walls 26 and end side walls 18 of about ⅜ to ½ inch to permit movement along the tortuous paths of even the largest size of bird feed such as sunflower seeds. The partitions 12 are elongate, extend generally at a right angle to the lengths of the outer edge walls 26 and perch bars 30, most have a length about equal to or greater than one half the distance between the adjacent edge wall 26 and end side wall 18 at the location of the partition 12, and each extend vertically from the top surface of the bottom wall 16 to generally the same height above that top surface 17 as the adjacent outer edge wall 26.

The feeder 10 also includes a top wall 32 including a major planar portion and opposed L-shaped channels 33 projecting downwardly from the major portion along opposite edges and adapted for sliding engagement around lips 34 projecting outwardly from the ends opposite the bottom wall 16 of opposite parallel front and rear side walls 18 to afford sliding movement of the top wall 32 relative to the side walls 18 from an open position (not shown) with the top wall 32 removed from the side walls 18 to afford filling the cavity 22 with bird feed 23, to a closed position with the top wall 32 over the cavity 22 as illustrated. The closed position for the top wall 32 is defined by engagement of stop lugs 35 projecting downwardly from the major potion of the top wall 32 with the outer surface of one of the end side walls 18, and at which closed position the top wall 32 is releasably retained by a similar latch lug 36 that in the closed position of the top wall 32 is adjacent the outer surface of the end side wall 18 opposite that abutted by the stop lugs 35 and will cam past the upper edges of the end side walls 18 upon the application of a small amount of force to afford sliding movement of the top wall 32 between its open and closed positions.

The feeder 10 also includes means for mounting the feeder 10 on a surface such as that of a window, which means comprises a bar 37 to which two suction cups 38 are affixed as by screws. The bar 37 has flanges tapered in width from a top end toward a bottom end of the bar 37 and is adapted to be removably received in a channel formed by the rear side wall 18, which channel also tapers in width from the bottom wall 16 toward the top wall 17 so that the bar 37 can be firmly fixed in the channel.

The feeder may, as illustrated, also include a thermometer 29 fixed to the rear side wall 18 so that a person viewing the feeder 10 may determine the outside temperature.

Figure 3:
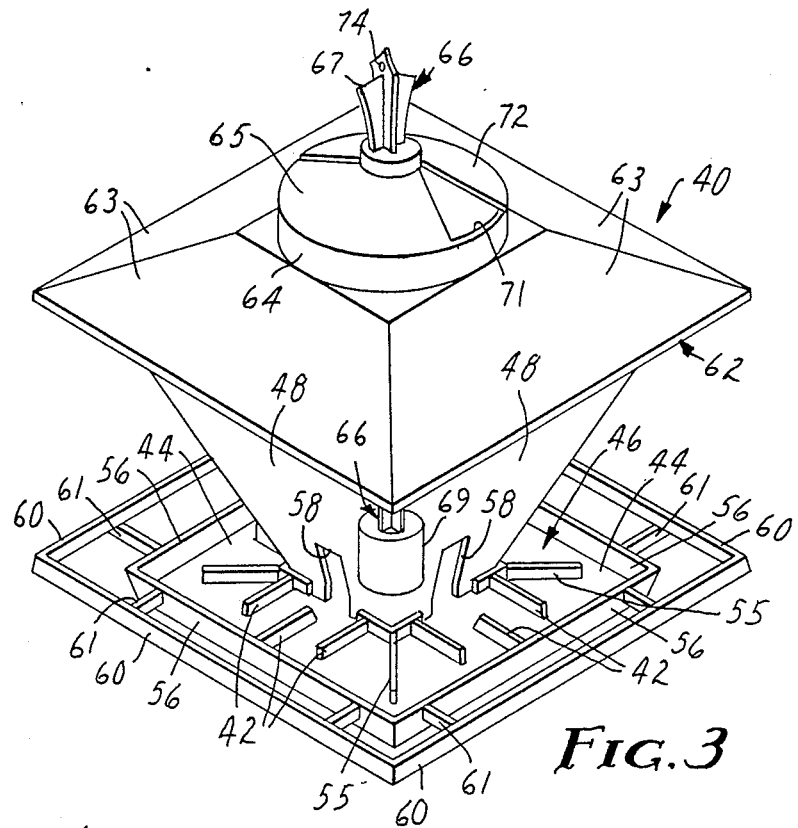
FIG. 3 is a perspective view of a second embodiment of a bird feeder according to the present invention.
Figure 4:
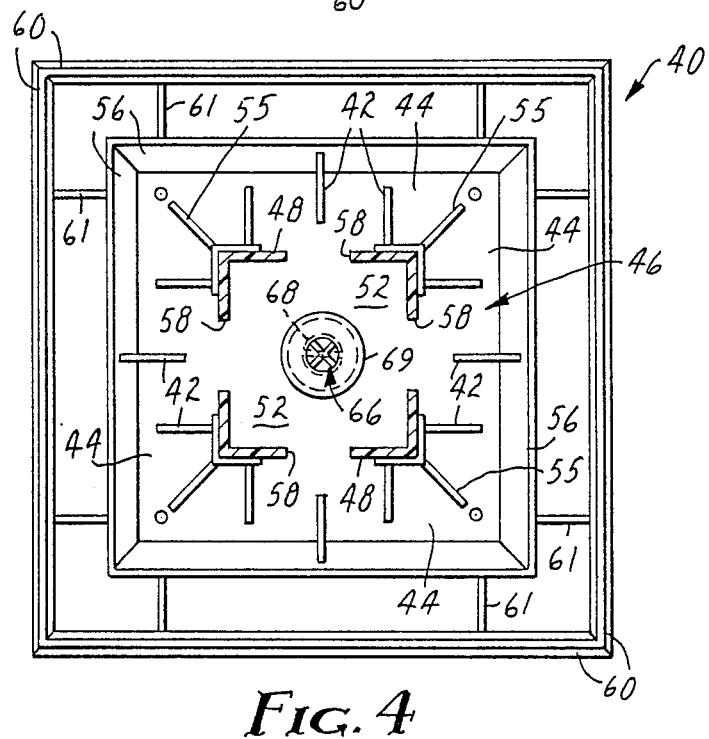
FIG. 4 is a horizontal sectional view of the bird feeder of FIG. 3.

Referring now to FIGS. 3 and 4 of the drawing, there is shown a second embodiment of a bird feeder according to the present invention, generally designated by the reference numeral 40; which bird feeder 40 has spaced vertical partitions 42 within four shallow feeding trays 44 on the feeder 40 to restrict brushing or scattering of bird feed from the feeding trays 44 by side to side motion of the bill of a bird feeding from the feeder 40, and to restrict wind from blowing bird feed from the feeding trays 44.

Generally the bird feeder 40 comprises a rectangular bottom wall 46 and four upwardly diverging side walls 48 attached together and to the bottom wall 46 along their edges and projecting above the bottom wall 46 so that a central portion of the bottom wall 46 and the side walls 48 define an inverted frustro-pyramidal shaped cavity 52 adapted to contain a supply of bird feed (not shown). The bottom wall 46 includes four peripheral portions extending past each of the side walls 48 and the feeder 40 further includes four elongate outer edge walls 56 attached to the peripheral portions of the bottom wall 46 and end to end to each other, and projecting above the bottom wall 46 at positions spaced from the adjacent side walls 48 to define with the peripheral portions of the bottom wall 46 and four end edge walls 55 extending part way between the junctures of the outer edge walls 56 and the junctures of the side walls 48, the four shallow feeding trays 44 that have shallow recesses adapted to contain bird feed. The bottom and side walls 46 and 48 define passageways 58 positioned generally centrally along the side walls 48 between the cavity 52 and the shallow recesses in the feeding trays 44, which passageways 58 afford the flow of bird feed from the cavity 52 into the shallow recesses. The feeder also includes perch means in the form of elongate perch bars 60 fixed in spaced generally parallel relationship along the outer edge walls 56 by normally projecting support bars 61 for allowing birds to perch along the outer edge walls 56 normally with the center lines of a perching bird oriented generally at a right angle to the length of the adjacent outer edge wall 56 and the perching bird facing the feeding tray 44 while it eats.

The feeder 40 also includes the improvement according to the present invention comprising a plurality of the vertical partitions 42 in spaced parallel relationship within the shallow recesses of the feeding trays 44 and extending at a right angle to the adjacent perch bars 60 at least part way between the outer edge walls 56 and their adjacent side walls 48, the purpose of which partitions 42 is to restrict brushing of bird feed from the shallow recesses by side to side motion of the bills of birds perched on the perch bars 60, and to restrict wind from blowing feed from the feeding trays 44. The spaced partitions 42 each extend less than the entire distance between the adjacent outer edge wall 56 and side wall 48, and the partitions 42 alternately are adjacent the side walls 48 and the outer edge walls 56 to form a labyrinth defining tortuous paths for movement of bird feed through the passageways 58 and along the recesses away from the passageways 58. Those tortuous paths have minimum widths between the partitions 42 and between the ends of the partitions 42 spaced from the outer edge walls 56 and end side walls 48 of about $\frac{3}{8}$ to $\frac{1}{2}$ inch to permit movement along the tortuous path of even the largest size of bird feed such as sunflower seeds. The partitions 42 are elongate, extend generally at a right angle to the lengths of the adjacent outer edge walls 56 and perch bars 60, and the partitions 42 have lengths greater than one half the distance between the adjacent outer edge wall 56 and side wall 48.

The feeder 40 also includes a top wall 62 including four portions 63 downwardly sloped from around a bottom end of a central cylindrical portion 64 from the upper end of which cylindrical portion 64 upwardly projects a conical portion 65. A central connecting rod 66 has a knob-like portion 67 on its upper end, passes centrally downwardly through a central opening in the tip of the conical portion 65 and the cavity 52, and has at its opposite end a bifurcated conical tip 68 with an annular recess around its base releasably attached to the upper end wall of a cylindrical upstanding projection 69 from the bottom wall 46 by having an annular lip on the end wall around an orifice therein through which the tip 68 passes received in the annular recess to attach together the bottom, side and top walls 46, 48, and 62. The conical portion 65 has an opening 71 on one side through which bird feed may be poured into the cavity 52, and the feeder 40 includes a closure wall 72 in the shape of a conical section that is rotatable about the tip of the conical portion 65 between an open position with the closure wall 72 over the opening 71 in the conical portion 65, and an open position with that opening 71 exposed so that bird feed can be poured into the cavity 52.

The feeder 40 also includes means for hanging the feeder 40 from an overhead object such as a tree limb in the form of a through opening 74 in the knob-like portion 67 adapted to receive a wire or the like for attaching the feeder 40 to that object.

The present invention has now been described with reference to two embodiments thereof. It will be apparent to those skilled in the art that many changes can be made in the embodiments described without departing from the scope of the present invention. For example, bird feeders according to the present invention may be made with a feeding tray having vertical partitions therein along only one side, and with an outer edge wall partially defining the feeding tray also providing the perch means on which a bird normally perches facing the feeding tray with the partitions disposed at a right angle to that outer edge wall. Also, when a side of a bird feeder according to the present invention on which a feeding tray is positioned is quite long, the feeder may have two or more passageways through which bird feed flows from a supply cavity into the feeding tray, and the feeder may have a plurality of such partitions with in the feeding tray associated with each opening to restrict wind from blowing bird feed from the feeding tray and to restrict birds perched facing the feeding tray from throwing bird feed out of the feeder by swinging their beaks. Thus the scope of the present invention should not be limited to the structures descried in this application, but only by structures described by the language of the claims and the equivalents of those structures.

I claim:

1. A bird feeder comprising a bottom wall having a top surface; side walls having inner and outer surfaces, said side walls being attached together and to said bottom wall and projecting above the top surface of said bottom wall so that a portion of said bottom and side walls define a cavity adapted to contain a supply of bird feed; said bottom wall including a tray portion extending past the outer surface of a first one of said side walls and said feeder further including an elongate outer edge wall attached to the tray portion of said bottom wall and projecting above said top surface at a position spaced from said first one of said side walls to define with said tray portion a shallow feeding tray between said first one of said side walls and said edge wall adapted to contain bird feed; said walls defining a passageway between said cavity and said shallow feeding tray located centrally along said first one of said side walls and affording the flow of bird feed from said cavity to said shallow feeding tray; perch means for allowing birds to perch along said edge wall facing said feeding tray generally at a right angle to the length of said edge wall; and a plurality of spaced vertical partitions within said shallow feeding tray and oriented at generally a right angle to said outer edge wall to restrict bird feed being blown from the shallow feeding tray and brushing of bird feed from the shallow feeding tray by side to side motion of the bill of a bird perched on said perch means, said spaced partitions extending less than the distance between said first one of said side walls and said outer edge wall with said partitions being alternately positioned adjacent said side wall and adjacent said edge wall to form a labyrinth defining tortuous paths for movement of bird feed through said opening and along said feeding tray in two directions away from said opening.

2. A bird feeder according to claim 1 wherein said partitions are elongate, and each of said partitions is spaced from adjacent partitions by about $\frac{3}{8}$ to $\frac{1}{2}$ inch and has a length about $\frac{3}{8}$ to $\frac{1}{2}$ inch less that the distance between said edge wall and said outer surface of said first one of said side walls.

3. A bird feeder according to claim 1 wherein said perch means comprises an elongate perch bar fixed in spaced relationship along said outer edge wall.

4. A bird feeder comprising a bottom wall having a top surface; side walls having inner and outer surfaces, said side walls being attached together and to said bottom wall and projecting above the top surface of said bottom wall so that a portion of said bottom wall and said side walls define a cavity adapted to contain a supply of bird feed; said bottom wall including tray portions extending past the outer surfaces of said side walls and said feeder further including elongate outer edge walls attached to the tray portions of said bottom wall and projecting above said top surface at positions spaced from said side walls to define with said tray portions shallow feeding trays adapted to contain bird feed; said walls defining passageways positioned generally centrally along said side walls between said cavity and said shallow feeding trays affording the flow of bird feed from said cavity to said shallow feeding trays; perch means for affording the perching of birds along said outer edge walls facing said feeding trays generally at a right angle to the lengths of said adjacent outer edge walls; and a plurality of spaced vertical partitions within said feeding trays to restrict blowing of bird feed from said shallow feeding trays and brushing of bird feed from said shallow feeding trays by side to side motion of the bills of birds perched on said perch means, said spaced partitions extending less than the distance between said side walls and said edge walls with said partitions being alternately positioned adjacent said side walls and adjacent said edge walls to form labyrinths defining tortuous paths for movement of bird feed through said openings and along said feeding trays away from said openings.

5. A bird feeder according to claim 4 wherein said partitions are elongate, extend generally at a right angle to the outer edge walls to which they are adjacent, and each partition is spaced from an adjacent partition by about ⅜ to ½ inch and has a length about ⅜ to ½ inch less than the distance between the adjacent said wall and outer edge wall.

6. A bird feeder according to claim 4 wherein said perch means comprises elongate perch bars, with each of said perch bars fixed in spaced relationship along a different one of said outer edge walls.

* * * * *